(12) United States Patent
Wurdeman

(10) Patent No.: US 11,317,621 B2
(45) Date of Patent: May 3, 2022

(54) SUBTERRANEAN CUTTER / RAKER COMBINATION

(71) Applicant: James A. Wurdeman, San Diego, CA (US)

(72) Inventor: James A. Wurdeman, San Diego, CA (US)

( * ) Notice: Subject to any disclaimer, the term of this patent is extended or adjusted under 35 U.S.C. 154(b) by 568 days.

(21) Appl. No.: 16/360,233

(22) Filed: Mar. 21, 2019

(65) Prior Publication Data

US 2019/0307115 A1 Oct. 10, 2019

Related U.S. Application Data

(60) Provisional application No. 62/653,625, filed on Apr. 6, 2018.

(51) Int. Cl.
*A01M 21/02* (2006.01)
*A01D 43/02* (2006.01)

(52) U.S. Cl.
CPC .............. *A01M 21/02* (2013.01); *A01D 43/02* (2013.01)

(58) Field of Classification Search
CPC ......... A01B 39/18; A01B 49/04; A01B 31/00; A01B 19/00; A01M 21/02; A01D 43/02
See application file for complete search history.

(56) References Cited

U.S. PATENT DOCUMENTS

| | | | | |
|---|---|---|---|---|
| 113,125 A | * | 3/1871 | Wood et al. | A01B 39/18 171/64 |
| 180,004 A | * | 7/1876 | Cook | A01D 43/02 56/175 |
| 194,977 A | * | 9/1877 | Ruhlmann | A01B 39/18 172/192 |
| 245,619 A | * | 8/1881 | Forbes | A01B 39/18 172/192 |
| 274,590 A | * | 3/1883 | Gregg | A01B 39/18 172/192 |
| 629,015 A | * | 7/1899 | Sherrill | A01B 39/18 172/192 |
| 1,003,481 A | * | 9/1911 | Magoon | A01B 39/18 172/192 |
| 1,341,231 A | * | 5/1920 | Hamilton | A01B 49/02 172/136 |
| 1,537,618 A | * | 5/1925 | Proper | A01D 43/02 56/400 |
| 1,609,101 A | * | 11/1926 | Asio | A01D 43/02 56/16.6 |
| 1,724,143 A | * | 8/1929 | Penland | A01B 39/18 172/310 |
| 1,917,556 A | * | 7/1933 | Soss | A01D 43/02 56/14.5 |

(Continued)

*Primary Examiner* — Jessica H Lutz
(74) *Attorney, Agent, or Firm* — Eric Hanscom

(57) ABSTRACT

A combination cutting blade/raking device where the blade portion slices weeds off under the soil, thereby effectively killing the plant, and a raking portion collects the uprooted weeds. The blade and rake also flatten the surface of the soil. The raking section of the invention can be lifted independently of the cutting blade. The cutting blade is reversible so a user of the invention can cut twice as much area before having to remove the blade for sharpening. The blade is slightly curved in cross section, allowing for a smoother cutting path through the soil.

10 Claims, 11 Drawing Sheets

(56) References Cited

U.S. PATENT DOCUMENTS

| | | | | | |
|---|---|---|---|---|---|
| 2,736,252 | A | * | 2/1956 | Latshaw | A01B 19/00 |
| | | | | | 172/643 |
| 2,791,340 | A | * | 5/1957 | Haines | A01D 87/08 |
| | | | | | 414/699 |
| 2,920,405 | A | * | 1/1960 | Cole | A01B 35/30 |
| | | | | | 172/142 |
| 3,448,814 | A | * | 6/1969 | Jackson | E02F 3/7604 |
| | | | | | 172/149 |
| 3,613,802 | A | * | 10/1971 | Carlson | A01D 76/00 |
| | | | | | 172/457 |
| 5,024,280 | A | * | 6/1991 | Mork | A01B 31/00 |
| | | | | | 172/149 |
| 5,806,605 | A | * | 9/1998 | Keigley | E02F 3/7622 |
| | | | | | 172/145 |
| 5,833,011 | A | * | 11/1998 | Boertlein | A01B 49/027 |
| | | | | | 172/149 |
| 6,739,404 | B2 | * | 5/2004 | Keigley | A01B 31/00 |
| | | | | | 172/684.5 |
| 7,540,331 | B1 | * | 6/2009 | Keigley | A01B 73/00 |
| | | | | | 172/195 |
| 7,730,643 | B2 | * | 6/2010 | Mishra | E01H 5/066 |
| | | | | | 37/266 |
| 8,528,655 | B1 | * | 9/2013 | Sterchi | A01B 21/04 |
| | | | | | 172/136 |
| 9,609,796 | B2 | * | 4/2017 | Keigley | A01B 31/00 |
| 2004/0050564 | A1 | * | 3/2004 | Wilson | A01B 31/00 |
| | | | | | 172/684.5 |
| 2012/0211247 | A1 | * | 8/2012 | Lorenz | A01B 49/02 |
| | | | | | 172/191 |
| 2014/0262387 | A1 | * | 9/2014 | Schmidt | A63B 57/50 |
| | | | | | 172/663 |
| 2019/0090427 | A1 | * | 3/2019 | Broderick | A01D 43/02 |

* cited by examiner

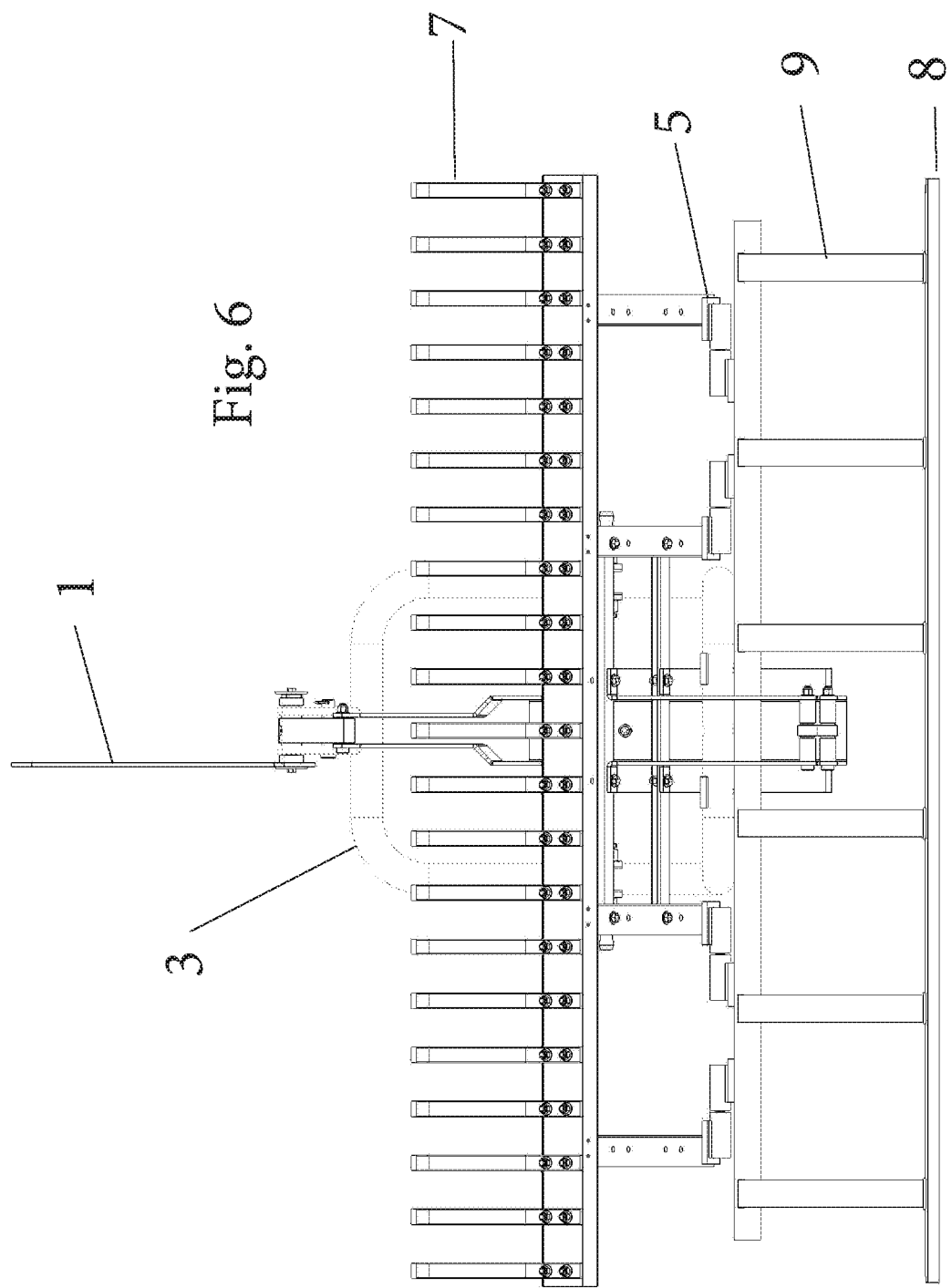

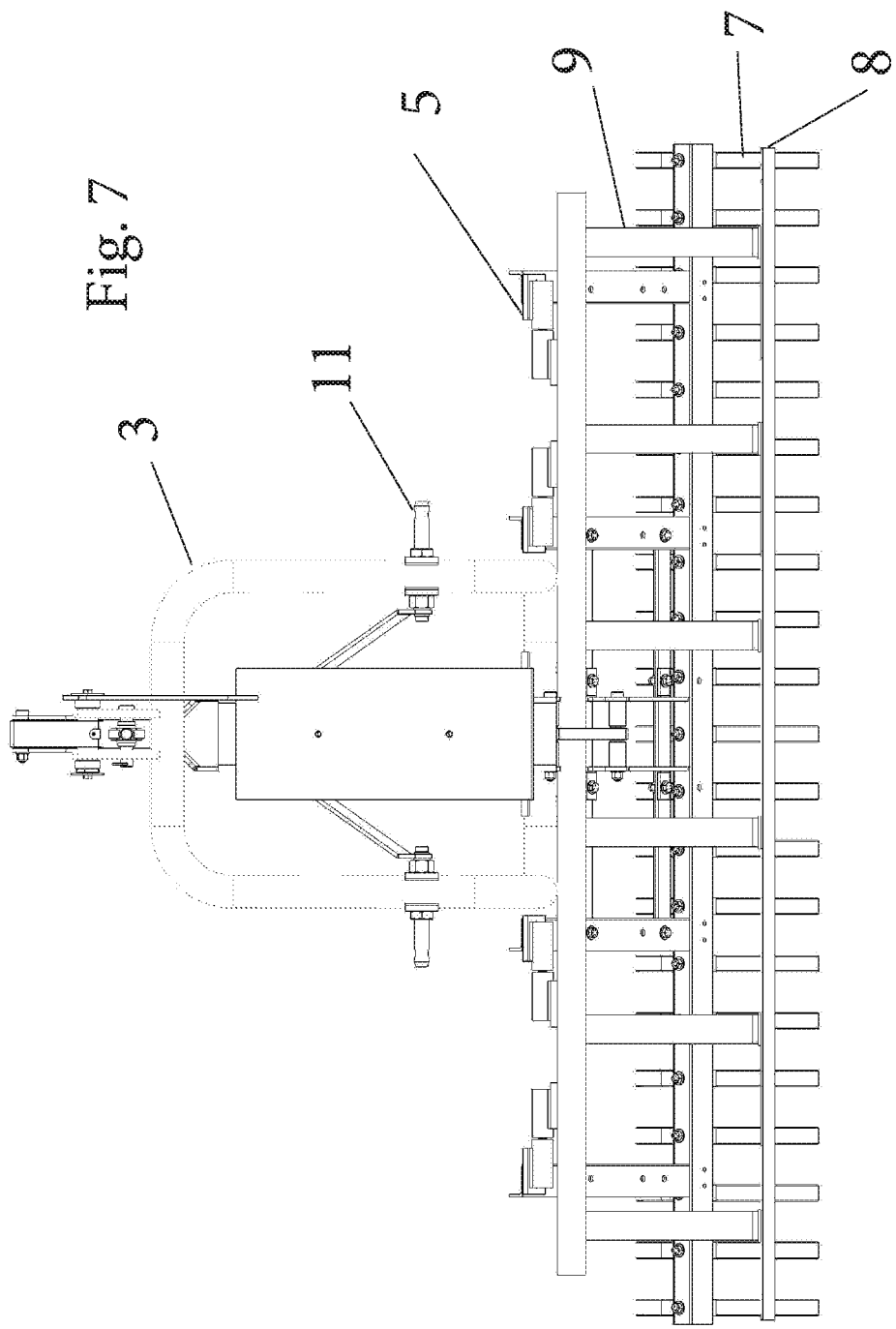

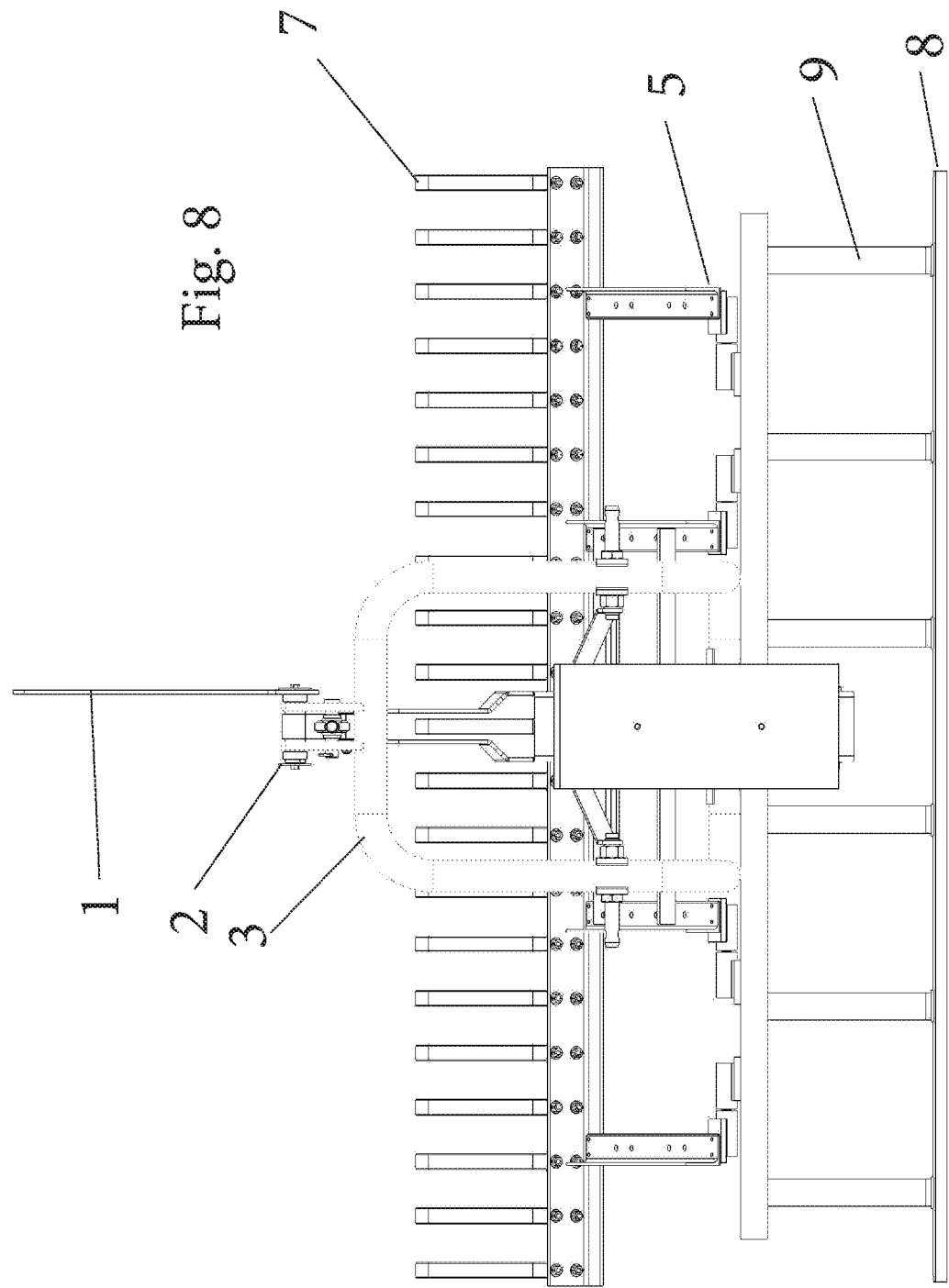

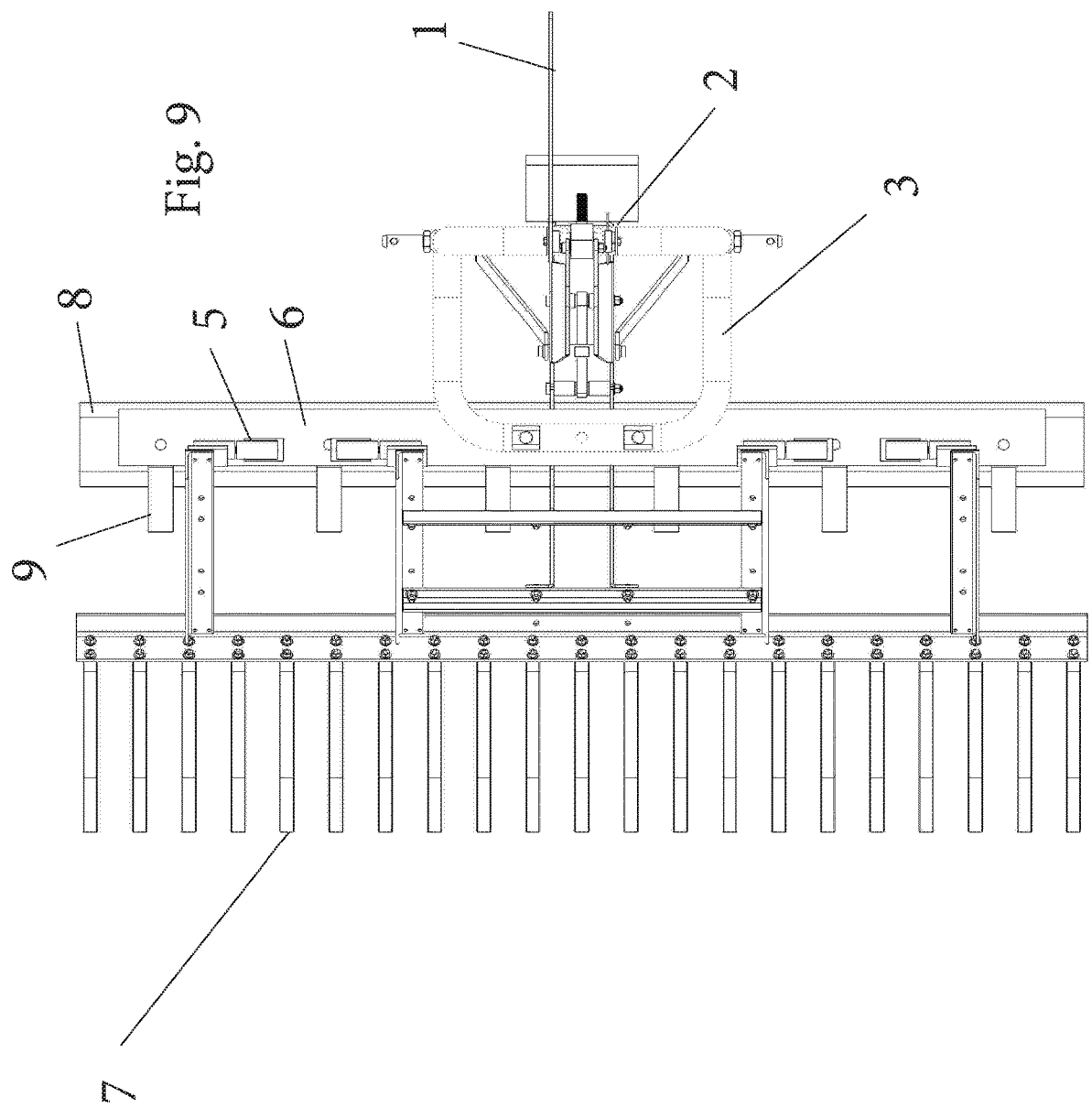

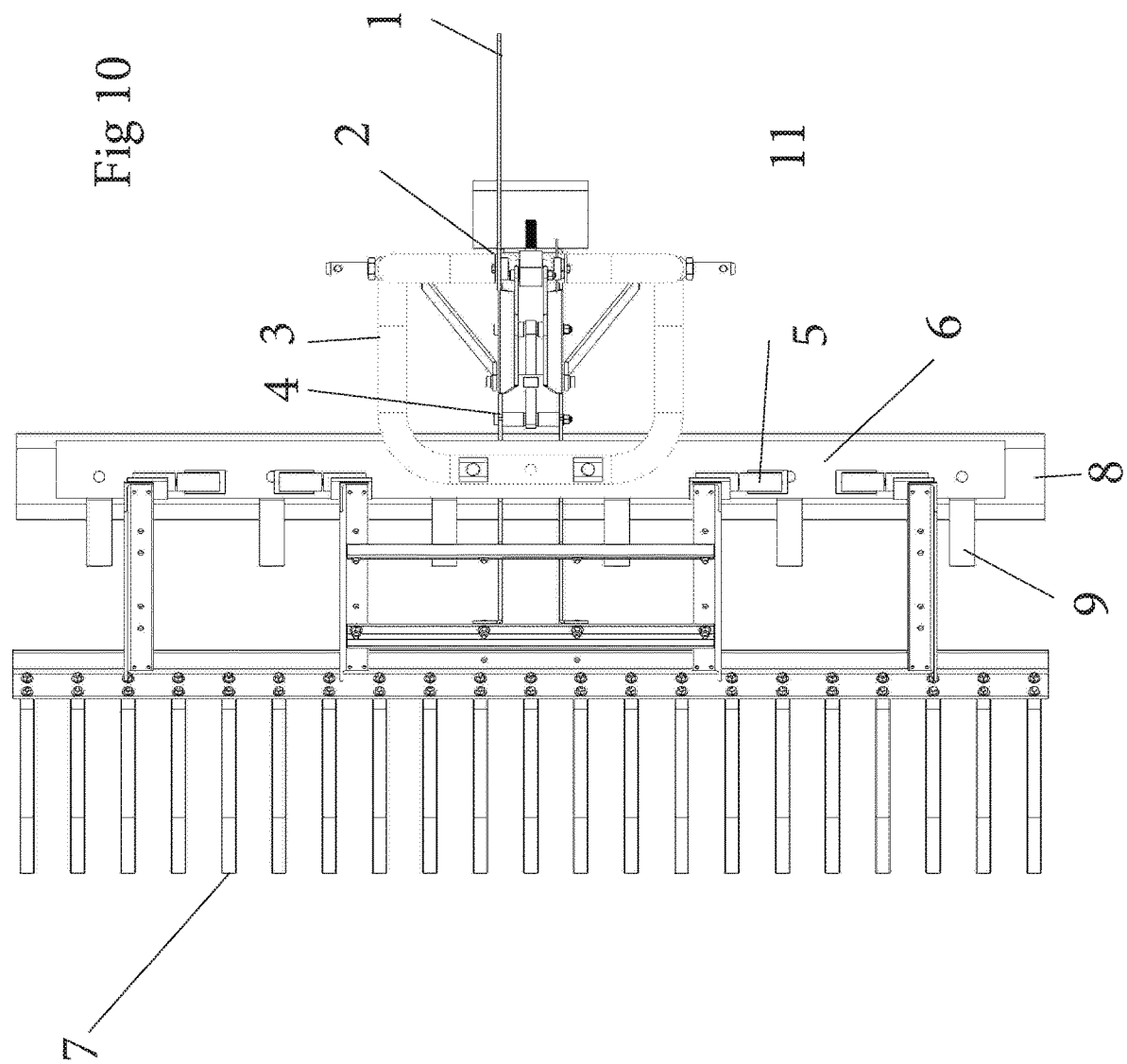

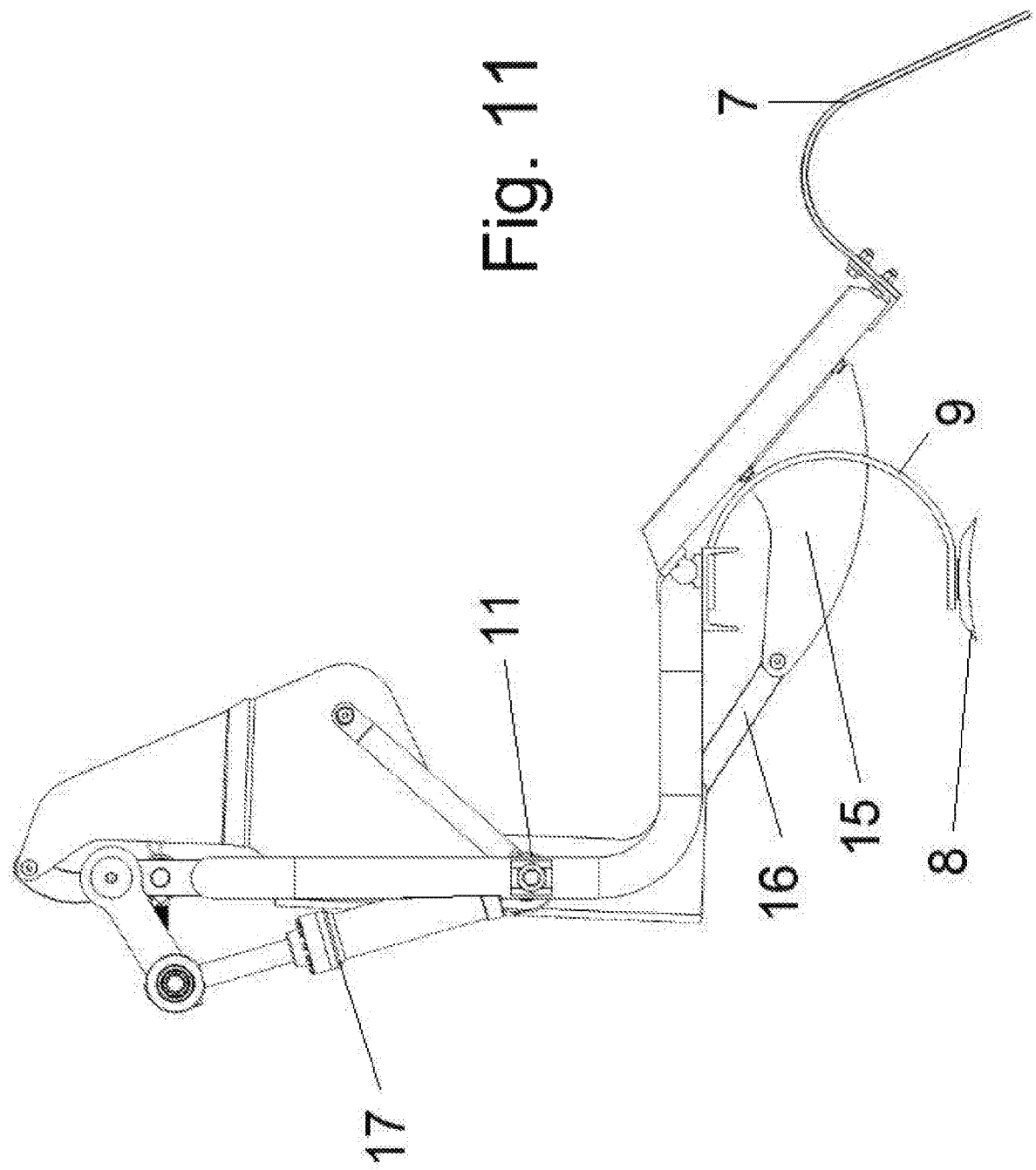

SUBTERRANEAN CUTTER / RAKER COMBINATION

CROSS REFERENCE TO RELATED APPLICATIONS

This application claims priority back to U.S. Provisional No. 62/653,625, entitled "Subterranean cutter/raker combination", filed 6, Apr. 2018, the contents of which is incorporated by reference.

STATEMENT REGARDING FEDERALLY SPONSORED RESEARCH OR DEVELOPMENT

This invention was not federally sponsored.

BACKGROUND OF THE INVENTION

Field of the Invention

This invention relates to the general field of weed removal and yard maintenance machines, and more specifically, a combination cutting/raking machine that has a reversible blade designed to glide under the surface of the ground, cutting off weeds below the intersection of the plant and its roots. Because the blade moves under the surface, it slices through the root system of the weed and disrupts the upper layer of the soil such that the rake, which follows the blade, can effectively collect the weeds for later disposal.

Brief Description of Invention

The invention has three basic components. First, a cutting component has a blade that slices through weeds at their roots. Second, a raking component collects the weeds and smooths the soil. Third, a lifting structure attaches the device to a hitch and allows a user of the invention to lift the raking component.

Problem Solved by this Invention

Let us begin with a quick botanical description of weeds. Weeds have a root system that drives down into the soil, and a plant system that climbs into the air. The roots collect water and nutrients, the plant produces leaves the photosynthesize water and carbon dioxide into sugars, and seeds that allow the weed to reproduce into other areas. The general goal of weeding is to kill the weed before it sets seed and creates another generation of weeds.

Weeds have been a problem facing farmers and homeowners for thousands of years. Over this time, a number of inventions and technologies have been developed to try to cope with weeds. A common approach is the cut the weed off at or above the ground. There is a plethora of prior art dealing with "lawn mower" devices that can cover large areas of land relatively quickly and cut the weeds off above the ground—hopefully keeping the weed from looking too unattractive and, hopefully again, cutting off any weed flowers and weed seeds before they can mature.

Examples of this technology can be found in CN105123109 to Jiang Fuxian and CN2909813 to Gangpu Koubu. While these machines appear to be effective at "trimming" weeds, along with everything else they move over, they do not get the weed out at the roots; hence, a few weeks later most weeds will have re-sprouted.

Probably the oldest method of weed removal is considerable more effective that the aforementioned products: namely, using a tool to completely dig out the weed. While this effectively kills the weed, it is very labor intensive, and impractical if a person wants to weed and entire agricultural field.

The idea of dragging a rack behind a cutting machine is also found in the prior art. For example, CN292478606U to Haosibayaer, CN2582349 to Dai Wei, and CN10403692 to Pang Qun all show a rake that can collect whatever debris is left behind by the machine running in front of the invention. However, if all the rake collects are the top portion of the weeds, the farmer or homeowner has to come back in a few weeks and cut all over again.

Thus, there has existed a long-felt need for a machine that can not only effectively kills weeds and rake them up, but also can be used effectively over large areas with minimal "down time" for blade sharpening, etc.

The current invention provides just such a solution by having a combination cutting blade/raking device where the blade portion slices weeds off under the soil, thereby effectively killing the plant, and a raking portion collects the uprooted weeds. The blade and rake also flatten the surface of the soil. The raking section of the invention can be lifted independently of the cutting blade. The cutting blade is reversible so a user of the invention can cut twice as much area before having to remove the blade for sharpening. The blade is slightly curved in cross section, allowing for a smoother cutting path through the soil

Objects of the Invention

It is therefore an object of the present invention to provide a machine that can effectively kill weeds and rake them up over a large area in a short amount of time.

Another object of the invention is to provide a machine with a cutting blade that moves under the soil to cut off weeds through their roots to prevent the weed from re-sprouting later.

An additional object of the invention is to provide a double sided cutting blade that is reversible, thereby doubling the time a user of the invention can spend in the field cutting before he/she needs to bring the blade into the shop for sharpening.

A further object of the invention is to provide a cutting blade with a slightly curved in cross-sectional view to allow for smoother cutting below the surface of the ground.

A final object of the invention is to provide for a rake that can be lifted independently of the cutting blade.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

BRIEF DESCRIPTION OF THE FIGURES

One preferred form of the invention will now be described with reference to the accompanying drawings.

FIG. 6 is a back view of the device with its rake section in an "up" position.

FIG. 7 is a front view of the device with its rake section in a "down" position.

FIG. 8 is a front view of the device with its rake section in an "up" position.

FIG. 9 is a top view of the device with its rake section in a "down" position.

FIG. 10 is a top view of the device with its rake section in an "up" position.

FIG. 11 is a side view of the device with a hydraulic rake lifter.

DETAILED DESCRIPTION OF THE FIGURES

Figure 1:
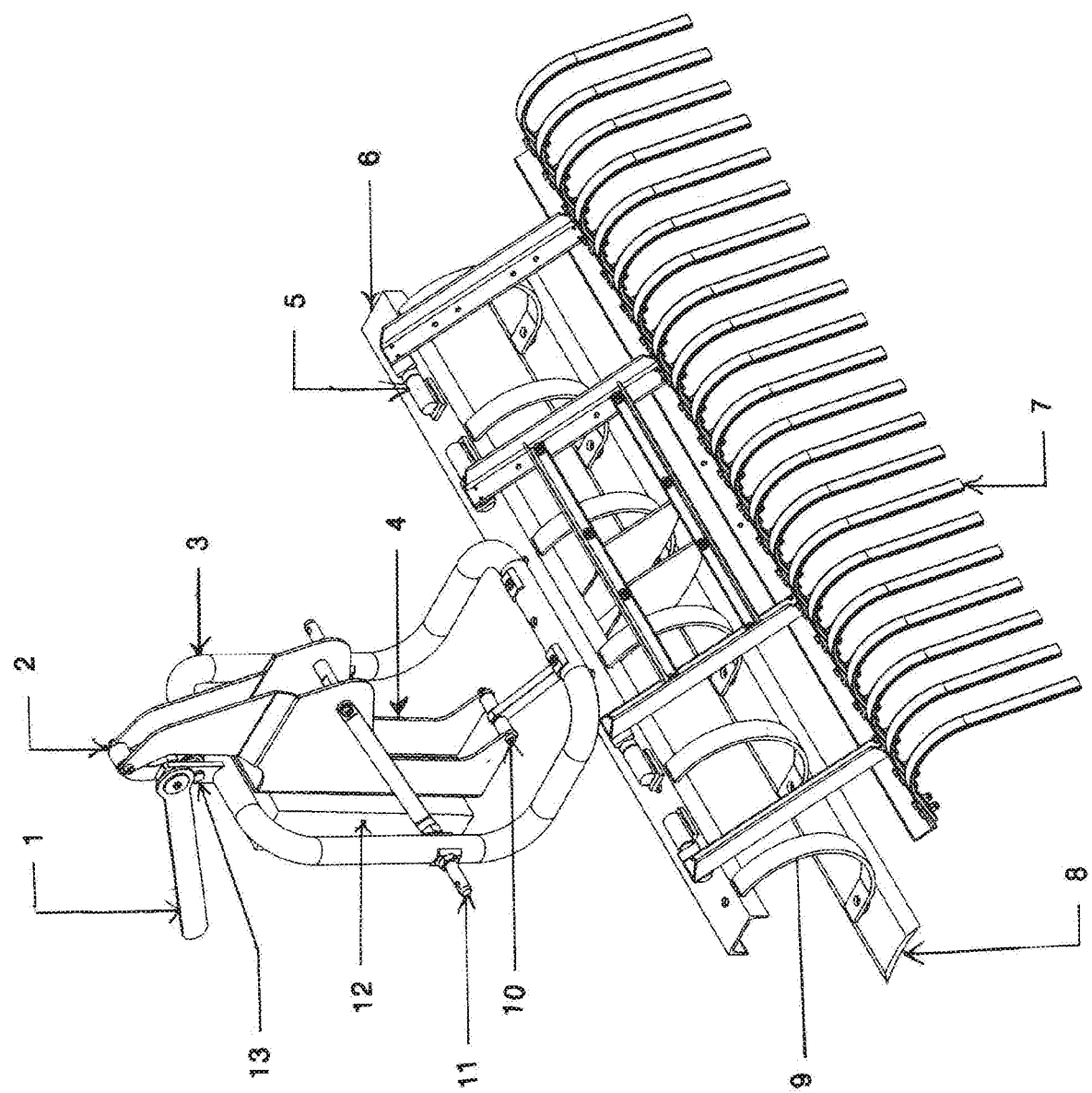
FIG. 1 is perspective view of a combination subterranean cutter/raker machine with its rake in a "down" position.

Many aspects of the invention can be better understood with references made to the drawings below. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

FIG. 1 is perspective view of a combination subterranean cutter/raker machine with its rake in a "down" position. The device has three basic components: a cutting component, a raking component and a lifting component. The cutting component and the raking component are both rotably connected to a Main Support Beam 6 by a Heavy-Duty Barrel Hinge 5. The Main Support Beam 6 is, in turn, connected to a Class 1 three-point hitch 3, which supports it.

The cutting component has a Reversible Edge Cutting Knife 8, which can be rotated to provide two separate cutting surfaces before it needs to be sharpened. The 8 is designed to one or more inches below the ground level, thereby effectively killing weeds by cutting them off at their roots, rather than the traditional methods taught by the prior art of just cutting off the tops, and thereby allowing the weeds to sprout up again. The Reversible Edge Cutting Knife 8 is held in place by several flexible Cutting Knife Springs 9. The flexibility allows for the Reversible Edge Cutting Knife 8 to be kept in place at a certain depth, but also to spring up and over any rocks or other hard objects it encounters.

Also attached to the Main Support Beam 6 is the raking component. The raking component has a number of Heavy Duty Landscape Rake Tines 7, which serve the purpose of collecting the weeds cut by the cutting component. The Heavy-Duty Landscape Rake Tines 7 is secured to a Rack Bracket 14, which is rotably attached to the 6 by several Heavy-duty barrel hinge 5, and can be raised or lowered by the lifting component. The Rack Bracket 14 has hingeably mates with the Heavy-duty barrel hinge 5, such that the Rack Bracket 14 and thereby the Heavy-Duty Landscape Rake Tines 7 can be rotated up by the lifting component.

The lifting component has a Rake Lifting Handle 1 by which a user of the invention can raise and lower the raking component. The 1 is attached to an Upper Linkage Pivot Bolt 2 and a Class 1 three-point hitch 3. When the Rake Lifting Handle 1 is raised, the Upper Linkage Pivot Bolt 2 is moved forward and down. This movement, in turn rotates a Landscape Rake Linkage 4 around a Lower Hitch Point 11, causing a Lower Linkage 16 to push against a Rack Bracket Strut 15. Because the Rack Bracket 14 is rotably connected to the Main Support Beam 6 at a number of Heavy duty barrel hinge 5, the rake component can only move up.

Figure 2:
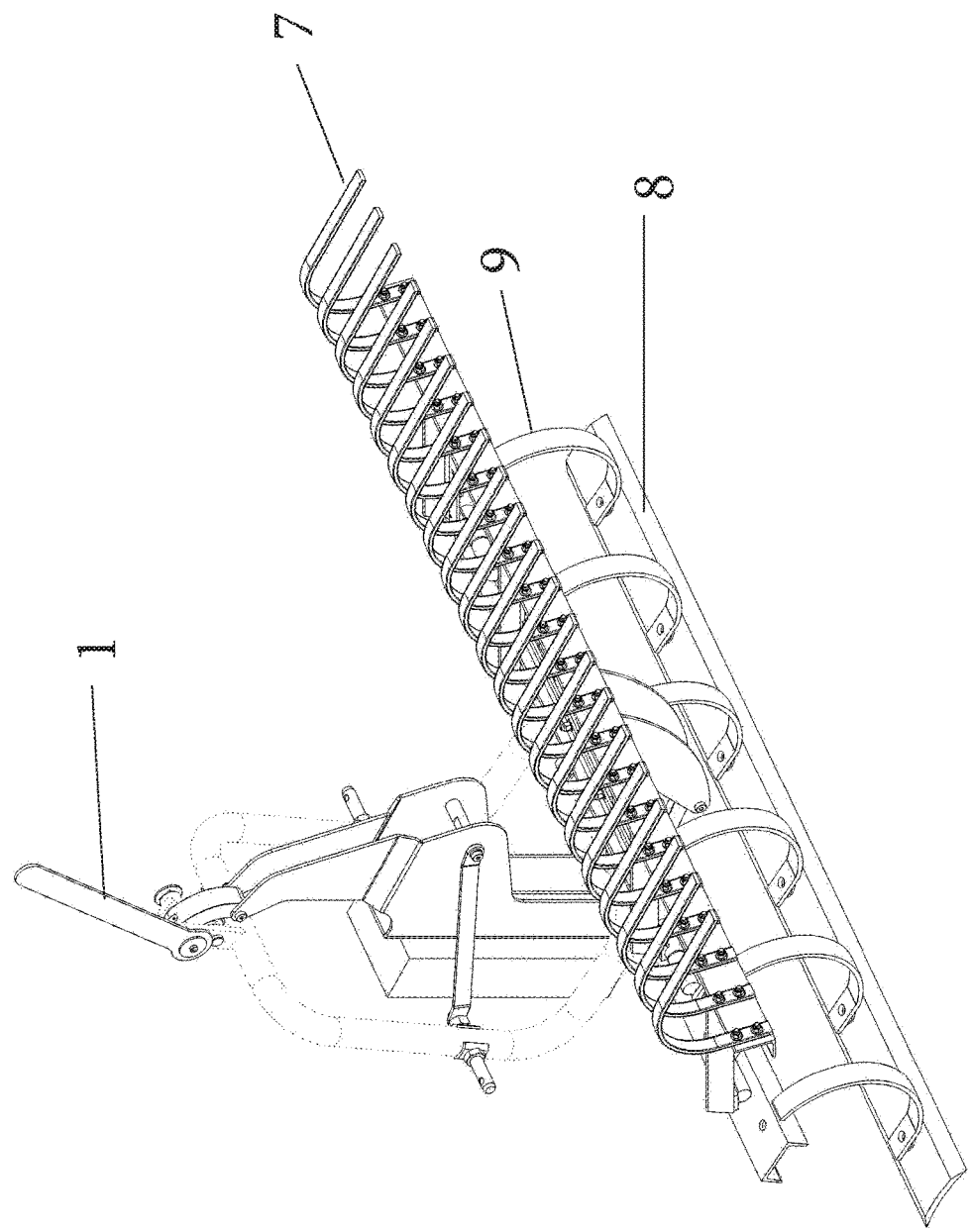
FIG. 2 is a perspective view of the device with its rake section in an "up" position.

FIG. 2 is a perspective view of the device with its rake section in an "up" position. The Rake Lifting Handle 1 has been pulled forward, thereby pivoting the Heavy-Duty Landscape Rake Tines 7 upright, while leaving the Reversible Edge Cutting Knife 8 in cutting position. This figure also shows the Cutting Knife Springs 9. The Cutting Knife Springs 9 are curved such that they retain the 8 in the ground, but at the same time provide some flexibility in case the Reversible Edge Cutting Knife 8 hits a rock or other hard object, such that the Reversible Edge Cutting Knife 8 can "bounce" up toward the top of the soil to avoid the hard object, and then be forced back to its selected depth.

Figure 3:
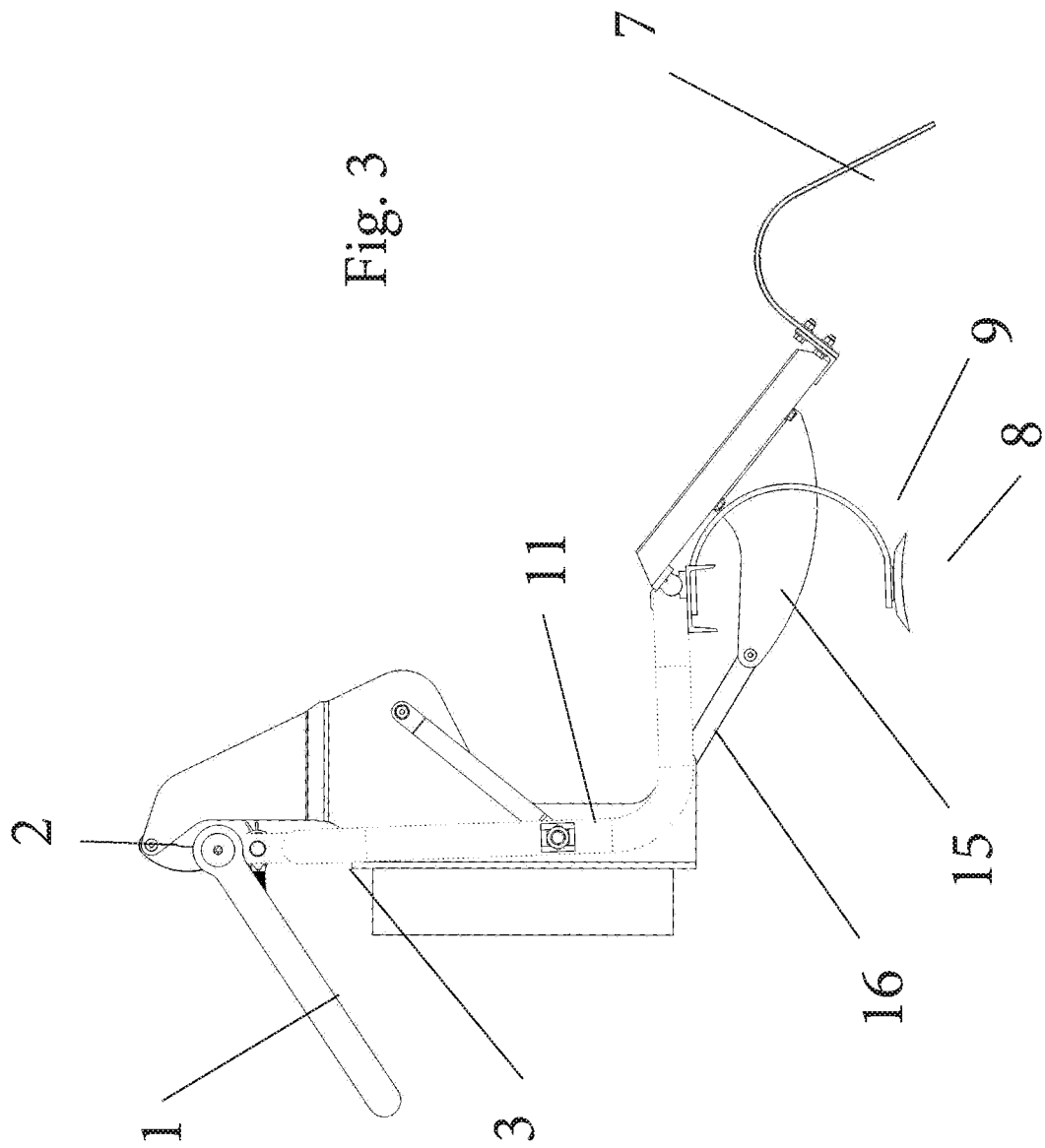
FIG. 3 is side view of the device with its rake section in a "down" position.

FIG. 3 is side view of the device with its rake section in a "down" position. The Rake Lifting Handle 1 is on a down position, thereby pushing up on the Upper Linkage Pivot Bolt 2, which then pivots the Lower Hitch Point 11, pulling back on the Lower Linkage 16, which, in turn, pulls back on the Rake Bracket Strut 15, thereby lowering the Heavy-Duty Landscape Rake Tines 7 into raking position.

Figure 4:
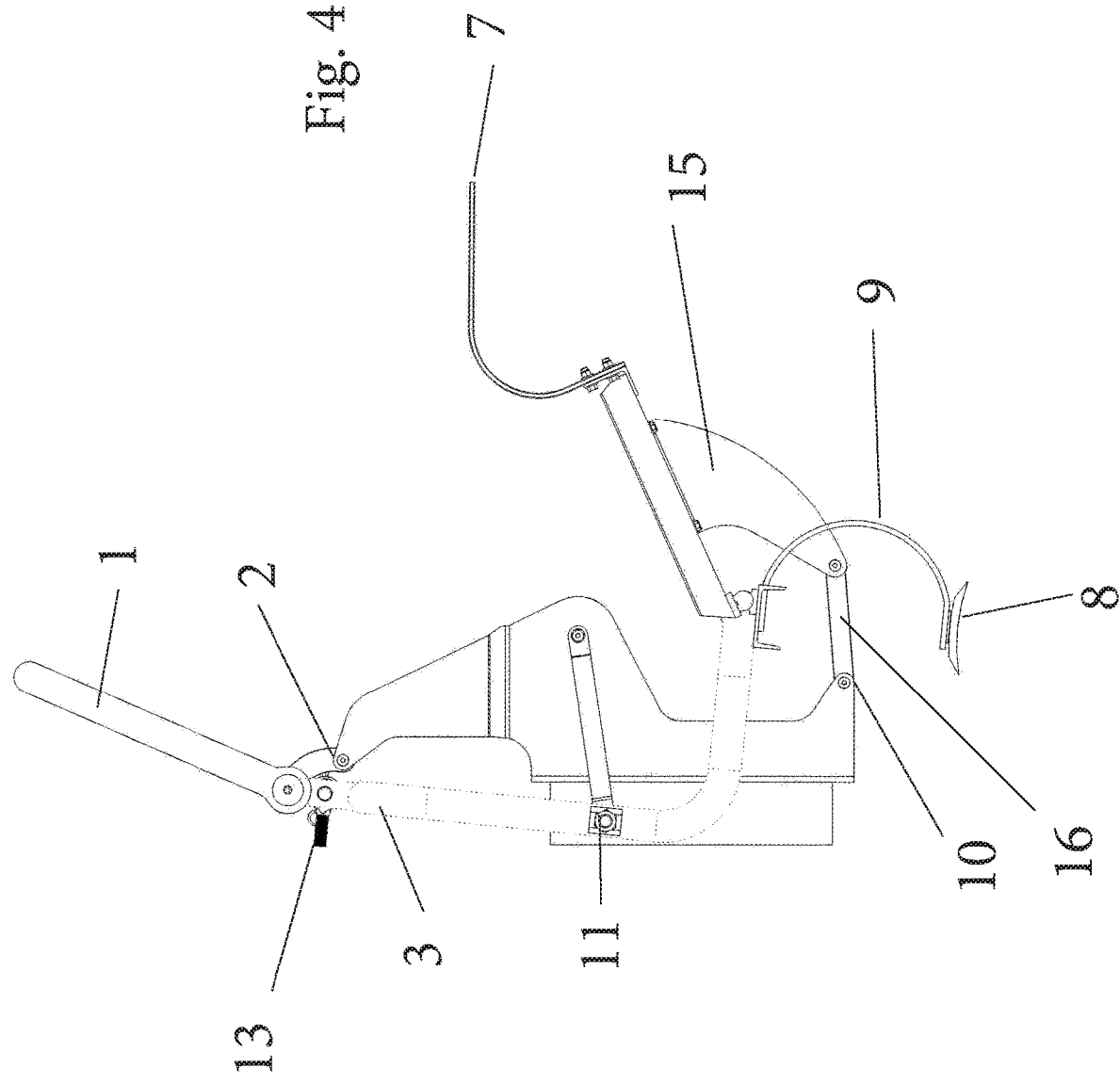
FIG. 4 is a side view of the device with its rake section in an "up" position.

FIG. 4 is a side view of the device with its rake section in an "up" position. The Rake Lifting Handle 1 has been pushed forward, thereby pushing forward on the Upper Linkage Pivot Bolt 2, which pivots about the Lower Hitch Point 11, pushing forward at the Lower Linkage Pivot Point 10 on the Lower Linkage 16, which in turn pushes forward on the Rake Bracket Strut 15. Since the raking mechanism is rotably coupled to the Class 1 three-point hitch 3, the only direction for the Heavy-Duty Landscape Rake Tines 7 to do is up, thereby lifting the Heavy-Duty Landscape Rake Tines 7 from the ground.

Figure 5:
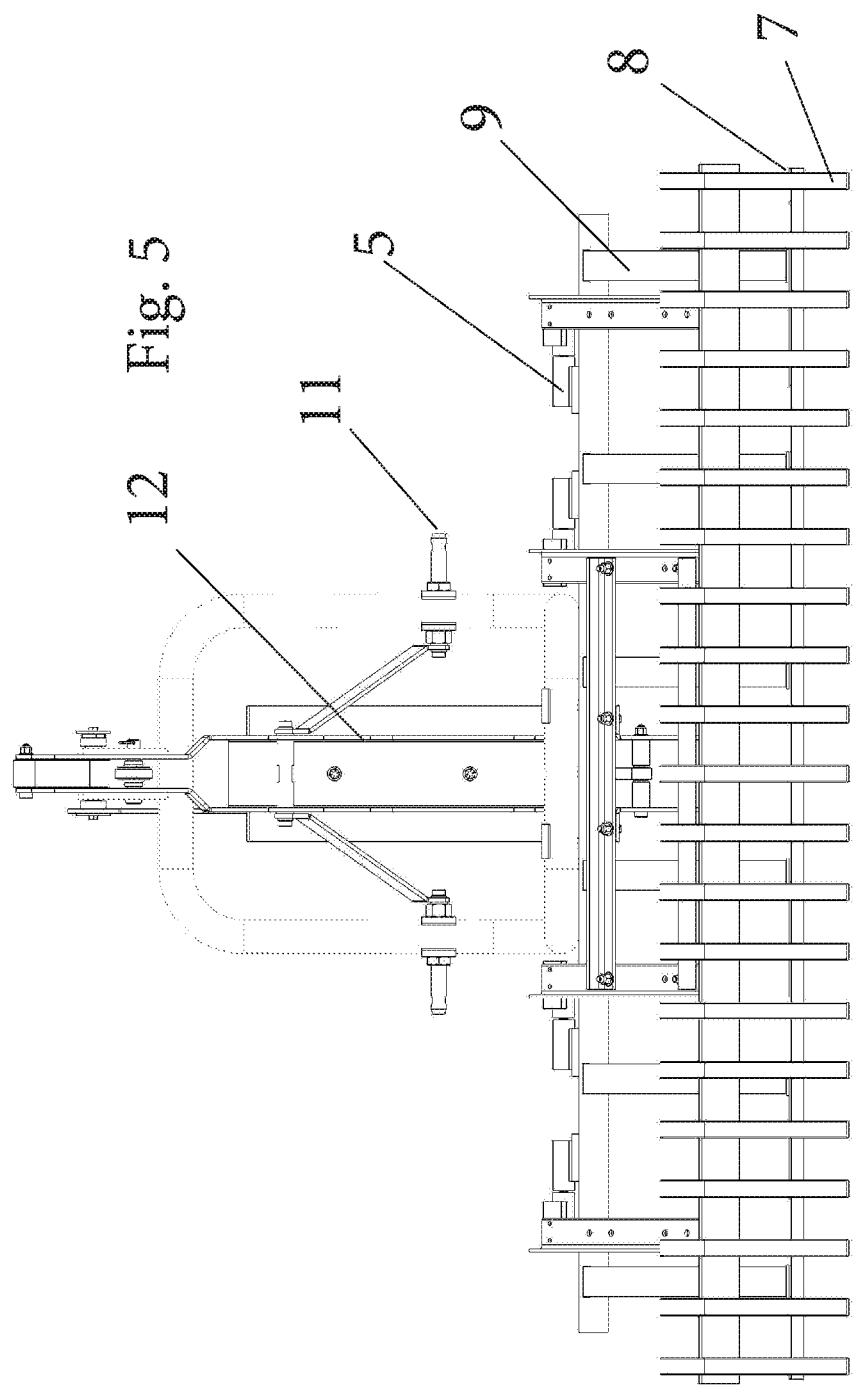
FIG. 5 is a back view of the device with its rake section in a "down" position.

FIG. 5 is a back view of the device with its rake section in a "down" position. The Heavy-Duty Landscape Rake Tines 7 are in a "down" position, having been rotated "down" at the 5., ready to collect the weeds sliced off by the 8.

FIG. 6 is a back view of the device with its rake section in an "up" position. The Lever 1 has been pulled back, thereby forcing the Heavy-Duty Landscape Rake Tines "up" as they rotate up from the Heavy-Duty Barrel Hinges 5. This "up" position allows a user of the invention to pick up the weeds that have been collected by the Heavy-duty landscape rake tines 7.

FIG. 7 is a front view of the device with its rake section in a "down" position. This would be the view from under a tractor pulling the device along. The Reversible edge cutting knife 8 is in position to slice off weeds below the surface of the ground. The Heavy-duty landscape rake tines 7 are aligned to collect any weeds sliced by the Reversible edge cutting knife 8, and to smooth out the soil after they pass over it.

FIG. 8 is a front view of the device with its rake section in an "up" position. The Lever 1 has been pushed up, thereby engaging the Upper linkage pivot 2, which pivots against the Class I three-point hitch 3. The Heavy-duty landscape rake tines 7 have been pivoted up through rotation of the Heavy-duty barrel hinge 5.

FIG. 9 is a top view of the device with its rake section in a "down" position. The Lever 1 is in a "down" position, thereby causing the Upper linkage pivot 2 to pivot against the Class I three-point hitch 3, forcing the Heavy-duty landscape rake tines 7 into the ground, where they can collect weeds sliced off by the Reversible edge cutting knife 8.

FIG. 10 is a top view of the device with its rake section in an "up" position. Lever 1 has been pushed to the "up" position, which has raised Heavy duty landscape rake tines 7. At this point, the user of the invention can drive the tractor forward a short distance, then collect the weeds that have been collected the by Heavy duty landscape rake tines 7.

FIG. 11 is a side view of the device with a hydraulic rake lifter. In this embodiment of the invention, a hydraulic lifter 17 is used, rather than a manual lever as is illustrated in FIG. 4. The hydraulic lifter 17 is connected to a hydraulic line on a tractor or other towing device. As with the function of the embodiment in FIG. 4, the hydraulic lifter 17 forces a pivot about the Lower Hitch Point 11, pushing forward at the Lower Linkage Pivot Point on the Lower Linkage 16, which in turn pushes forward on the Rake Bracket Strut 15. Since the raking mechanism is rotably coupled to the Class 1 three-point hitch 3, the only direction for the Heavy-Duty Landscape Rake Tines 7 to do is up, thereby lifting the Heavy-Duty Landscape Rake Tines 7 from the ground.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

REFERENCE NUMBERS USED

1. Rake lifting handle
2. Upper linkage pivot bolt
3. Class I three-point hitch
4. Landscape rake linkage
5. Heavy duty barrel hinge
6. Main support beam
7. Heavy duty landscape rake tines
8. Reversible edge cutting knife
9. Cutting knife spring
10. Lower linkage pivot point
11. Lower hitch point
12. Counter weight
13. Upper hitch point
14. Rake bracket
15. Rack bracket strut
16. Lower linkage
17. Hydraulic lifter That which is claimed:

1. A device for removing weeds from a field, comprising: a base, a plurality of landscape rake tines, and a cutting knife, where the cutting knife is attached to the base, and the landscape rake tines are attached to the base, and where the cutting knife is secured to the base such that the cutting knife travels through a soil, below a surface of the soil, where the base is a three-point hitch, where the cutting knife is a reversible edge cutting knife, where the device additionally comprises at least two cutting knife springs, where the reversible edge cutting knife is attached to the base by the at least two cutting knife springs, where each of the at least two cutting knife springs is curved, such that the reversible edge cutting knife will spring back if the reversible edge cutting knife encounters a hard object in the soil, additionally comprising a main support beam, where at least two cutting knife springs and the plurality of landscape rake tines at attached to the main support beam, and where the main support beam is attached to the three-point hitch, where the plurality of landscape rake tines are attached to the main support beam at two or more hinges, where two or more hinges allow the plurality of landscape rake tines to rotate between a down position and an up position, where at the down position, the plurality of landscape rake tines are positioned with at least a portion of each of the plurality of landscape rake tines in the soil, and where at the up position each of the plurality of landscape rake tines are positioned such that no portion of each of the plurality of landscape rake tines is in the soil, where each of the two or more hinges is a barrel hinge, additionally comprising a rake bracket, where the rake bracket is attached to the two or more barrel hinges, and the plurality of landscape rake tines are attached to the rake bracket, such that the rake bracket can rotate off the two or more barrel hinges and extend the plurality of landscape rake tines in an upward direction and a downward direction, additionally comprising a rake lifting handle, where the rake lifting handle has a handle up position and a handle back position, when the rake lifting handle is in the handle back position, the rake lifting handle can force the plurality of landscape rake tines in the downward direction and when the rake lifting handle is in the handle up position, the rake lifting handle can force the plurality of landscape rake tines in the upward direction, additionally comprising a rotation-forcing component, where the rotation-forcing component comprises an upper linkage pivot bolt, a landscape rake linkage, a lower linkage pivot point, a lower hitch point, a counterweight, an upper hitch point, a rack bracket strut, and a lower linkage, where the rake lifting handle is attached to the rotation-forcing component, and when the rake lifting handle is in the handle back position, the rotation-forcing component forces the plurality of landscape rake tines down into the soil, and when the rake lifting handle is in the handle up position, the rotation-forcing component lifts the plurality of landscape rake tines out of the soil, where the rake lifting handle is rotably connected to the upper linkage pivot bolt, and the upper linkage pivot bolt is rotably connected to the landscape rake linkage, and the landscape rake linkage pivots around the lower hitch point, and the lower hitch point is secured through the three-point hitch, and the landscape rake linkage is connected to the lower linkage pivot point to the lower linkage, and the lower linkage is connected to the rack bracket strut, and the rack bracket strut is connected to the rake bracket, where, when the rake lifting handle when in a back position the upper linkage pivot bolt forces the landscape rake linkage in a upward direction, which causes the lower linkage to pull in a backward direction, thereby causing the rack bracket strut to also pull backward, thereby causing the rack bracket to pivot downward off the two or more barrel hinges, thereby forcing the plurality of landscape rake tines into the soil, where, when the rake lifting handle when in an up position the upper linkage pivot bolt forces the landscape rake linkage in a downward direction, which causes the lower linkage to push down in a forward direction, thereby causing the rack bracket strut to also push forward, thereby causing the rack bracket to pivot upward off the two or more barrel hinges, thereby forcing the plurality of landscape rake tines out of the soil.

2. A device for removing weeds from a field, comprising: a base, a plurality of landscape rake tines, and a cutting knife, where the cutting knife is attached to the base, and the landscape rake tines are attached to the base, and where the cutting knife is secured to the base such that the cutting knife travels through a soil, below a surface of the soil, where the base is a three-point hitch, where the cutting knife is a reversible edge cutting knife, where the device additionally comprises at least two cutting knife springs, where the reversible edge cutting knife is attached to the base by the at least two cutting knife springs, where each of the at least two cutting knife springs is curved, such that the reversible edge cutting knife will spring back if the reversible edge cutting knife encounters a hard object in the soil, additionally comprising a main support beam, where at least two cutting knife springs and the plurality of landscape rake tines at attached to the main support beam, and where the main support beam is attached to the three-point hitch, where the plurality of landscape rake tines are attached to the main support beam at two or more hinges, where the two or more hinges allow the plurality of landscape rake tines to rotate between a down position and an up position, where at the down position, the plurality of landscape rake tines are positions with at least a portion of each of the plurality of landscape rake tines in the soil, and where at the up position each of the plurality of landscape rake tines are positioned such that no portion of each of the plurality of landscape rake tines is in the soil, where each of the two or more hinges is a barrel hinge.

3. The device of claim 2, additionally comprising a rake bracket, where the rake bracket is attached to the two or more barrel hinges, and the plurality of landscape rake tines are attached to the rake bracket, such that the rake bracket can rotate off the two or more barrel hinges and extend the plurality of landscape rake tines in an upward direction and a downward direction.

4. The device of claim 3, additionally comprising a rake lifting handle, where the rake lifting handle has a handle up position and a handle back position, when the rake lifting handle is in the handle back position, the rake lifting handle can force the plurality of landscape rake tines in the downward direction and when the rake lifting handle is in the handle up position, the rake lifting handle can force the plurality of landscape rake tines in the upward direction.

5. The device of claim 4, additionally comprising a rotation-forcing component, where the rotation-forcing component comprises an upper linkage pivot bolt, a landscape rake linkage, a lower linkage pivot point, a lower hitch point, a counterweight, an upper hitch point, a rack bracket strut, and a lower linkage, where the rake lifting handle is attached to the rotation-forcing component, and when the rake lifting handle is in the handle back position, the rotation-forcing component forces the plurality of landscape rake tines down into the soil, and when the rake lifting handle is in the handle up position, the rotation-forcing component lifts the plurality of landscape rake tines out of the soil.

6. The device of claim 5, where the rake lifting handle is rotably connected to the upper linkage pivot bolt, and the upper linkage pivot bolt is rotably connected to the landscape rake linkage, and the landscape rake linkage pivots around the lower hitch point, and the lower hitch point is secured through the three-point hitch, and the landscape rake linkage is connected to the lower linkage pivot point to the lower linkage, and the lower linkage is connected to the rack bracket strut, and the rack bracket strut is connected to the rake bracket.

7. The device of claim 6, where, when the rake lifting handle when in a back position the upper linkage pivot bolt forces the landscape rake linkage in a upward direction, which causes the lower linkage to pull in a backward direction, thereby causing the rack bracket strut to also pull backward, thereby causing the rack bracket to pivot downward off the two or more barrel hinges, thereby forcing the plurality of landscape rake tines into the soil.

8. The device of claim 7, where, when the rake lifting handle when in an up position the upper linkage pivot bolt forces the landscape rake linkage in a downward direction, which causes the lower linkage to push down in a forward direction, thereby causing the rack bracket strut to also push forward, thereby causing the rack bracket to pivot upward off the two or more barrel hinges, thereby forcing the plurality of landscape rake tines out of the soil, where the number of hinges is four, the number of rake brackets is four, and the number of cutting knife springs is four.

9. A device for removing weeds from a field, comprising: a base, a plurality of landscape rake tines, and a cutting knife, where the cutting knife is attached to the base, and the landscape rake tines are attached to the base, and where the cutting knife is secured to the base such that the cutting knife travels through a soil, below a surface of the soil, where the base is a three-point hitch, where the cutting knife is a reversible edge cutting knife where the device additionally comprises at least two cutting knife springs, where the reversible edge cutting knife is attached to the base by the at least two cutting knife springs, where each of the at least two cutting knife springs is curved, such that the reversible edge cutting knife will spring back if the reversible edge cutting knife encounters a hard object in the soil, additionally comprising a main support beam, where at least two cutting knife springs and the plurality of landscape rake tines at attached to the main support beam, and where the main support beam is attached to the three-point hitch, where the plurality of landscape rake tines area attached to the main support beam at two or more hinges, where two or more hinges allow the plurality of landscape rake tines to rotate between a down position and an up position, where at the down position, the plurality of landscape rake tines are positions with at least a portion of each of the plurality of landscape rake tines in the soil, and where at the up position each of the plurality of landscape rake tines are positioned such that no portion of each of the plurality of landscape rake tines is in the soil, where the plurality of landscape rake tines area attached to the main support beam at two or more hinges, where the two or more hinges allow the plurality of landscape rake tines to rotate between a down position and an up position, where at the down position, the plurality of landscape rake tines are positions with at least a portion of each of the plurality of landscape rake tines in the soil, and where at the up position each of the plurality of landscape rake tines are positioned such that no portion of each of the plurality of landscape rake tines is in the soil, where each of the two or more hinges is a barrel hinge, additionally comprising a rake bracket, where the rake bracket is attached to the two or more barrel hinges, and the plurality of landscape rake tines are attached to the rake bracket, such that the rake bracket can rotate off the two or more barrel hinges and extend the plurality of landscape rake tines in an upward direction and a downward direction, additionally comprising a rake lifting handle, where the rake lifting handle has a handle up position and a handle back position, when the rake lifting handle is in the handle back position, the rake lifting handle can force the plurality of landscape rake tines in the downward direction and when the rake lifting handle is in the handle up position, the rake lifting handle can force the plurality of landscape rake tines in the upward direction, additionally comprising a hydraulic rake lifter, where the hydraulic rake lifter can force the plurality of Heavy-duty landscape rake tines in the downward direction and when the rake lifting handle is in the handle up position, the rake lifting handle can force the plurality of Heavy-duty landscape rake tines in the upward direction.

10. The device of claim 9, additionally comprising a rotation-forcing component, where the rotation-forcing component comprises an upper linkage pivot bolt, a landscape rake linkage, a lower linkage pivot point, a lower hitch point, a counterweight, an upper hitch point, a rack bracket strut, and a lower linkage, where the rake lifting handle is attached to the rotation-forcing component, and when the rake lifting handle is in the handle back position, the rotation-forcing component forces the plurality of landscape rake tines down into the soil, and when the rake lifting handle is in the handle up position, the rotation-forcing component lifts the plurality of landscape rake tines out of the soil, where the rake lifting handle is rotably connected to the upper linkage pivot bolt, and the upper linkage pivot bolt is rotably connected to the landscape rake linkage, and the landscape rake linkage pivots around the lower hitch point, and the lower hitch point is secured through the three-point hitch, and the landscape rake linkage is connected to the lower linkage pivot point to the lower linkage, and the lower linkage is connected to the rack bracket strut, and the rack bracket strut is connected to the rake bracket.

\* \* \* \* \*